United States Patent
Takahashi

(10) Patent No.: US 8,405,993 B2
(45) Date of Patent: Mar. 26, 2013

(54) ELECTRO-OPTICAL DEVICE AND ELECTRONIC APPARATUS

(75) Inventor: Nariya Takahashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 13/079,209

(22) Filed: Apr. 4, 2011

(65) Prior Publication Data

US 2011/0242763 A1    Oct. 6, 2011

(30) Foreign Application Priority Data

Apr. 5, 2010   (JP) ................. 2010-086761

(51) Int. Cl.
H05K 7/20    (2006.01)
G06F 9/30    (2006.01)

(52) U.S. Cl. .............. 361/704; 361/679.21; 361/679.54; 361/707; 361/709; 361/710; 361/715; 165/80.3; 165/104.33; 165/185; 353/52; 353/122; 349/58; 349/62; 349/110; 349/111; 362/632; 362/231; 362/294; 372/36

(58) Field of Classification Search ............ 361/679.21, 361/679.46, 679.54, 690–697, 704–715, 361/717–728; 165/80.2–80.5, 104.33, 104.34, 165/121–126, 185; 174/15.1, 16.3, 252; 257/706–727; 353/52, 54, 122; 349/52, 349/54, 56, 62, 64, 65, 149, 151–158, 189, 349/190; 362/231, 294, 632–624; 372/33–36, 372/10, 92, 102; 385/14, 15, 92, 94, 131, 385/132; 348/771
See application file for complete search history.

(56) References Cited

U.S. PATENT DOCUMENTS

| 5,742,366 | A  | * | 4/1998  | Imoto ........................... 349/62 |
| 6,414,781 | B1 | * | 7/2002  | Saitoh ......................... 359/245 |
| 6,549,320 | B2 | * | 4/2003  | Fujimori ...................... 359/246 |
| 6,731,367 | B1 | * | 5/2004  | Saitoh ......................... 349/158 |
| 7,139,062 | B2 | * | 11/2006 | Saitoh ......................... 349/161 |
| 7,228,020 | B2 | * | 6/2007  | Weigert ......................... 385/14 |
| 7,702,191 | B1 | * | 4/2010  | Geron et al. ................... 385/14 |
| 7,967,454 | B2 | * | 6/2011  | Hirabayashi et al. ......... 353/122 |
| 8,184,432 | B2 | * | 5/2012  | Miyashita ................ 361/679.21 |
| 2009/0146158 | A1 | * | 6/2009  | Park ............................. 257/89 |
| 2010/0271782 | A1 | * | 10/2010 | Miyashita ..................... 361/707 |
| 2011/0199733 | A1 | * | 8/2011  | Hirabayashi et al. ......... 361/707 |

FOREIGN PATENT DOCUMENTS

| JP | 2006258883 | A | * | 9/2006 |
| JP | 2007-298615 | A |   | 11/2007 |
| JP | 2008-015386 | A |   | 1/2008 |
| JP | 2010-014809 | A |   | 1/2010 |

* cited by examiner

*Primary Examiner* — Michail V Datskovskiy

(74) *Attorney, Agent, or Firm* — ALG Intellectual Property, LLC

(57) ABSTRACT

An electro-optical device includes: an element substrate and an opposing substrate disposed so as to oppose each other; liquid crystals encapsulated and sealed between the two substrates; a display region that displays an image by modulating incident light based on image information; a heat dissipation member disposed opposing a second surface of the element substrate, the second surface being on the opposite side as the opposing substrate; and a thermal conductive member disposed between the element substrate and the heat dissipation member. The dimension from the end portion of where the thermal conductive member and the element substrate make contact with each other to the end portion of the display region on the second surface of the element substrate is greater than the thickness of the element substrate.

5 Claims, 5 Drawing Sheets

ELECTRO-OPTICAL DEVICE AND ELECTRONIC APPARATUS

Japanese Patent Application No. 2010-086761, filed Apr. 5, 2010 is incorporated by reference in its entirety herein.

BACKGROUND

1. Technical Field

The present invention relates to electro-optical devices and electronic apparatuses.

2. Related Art

Recent years have seen an increase in the demand for higher-luminosity projected images from projectors that use reflective liquid crystal elements (reflective liquid crystal panels). Although increasing the luminosity of the light source can be considered as one way of meeting this demand, doing so also increases the temperature of the reflective liquid crystal panel. In particular, the light sources used for such applications often do have only uniform power distribution, and thus the temperature in the central area of the reflective liquid crystal panel (that is, the panel center) becomes hotter than the outer edge areas (that is, the panel outer edges), which dissipate heat more easily. When such a temperature distribution occurs, the liquid crystals in the panel center degrade at a faster rate than the liquid crystals in the panel outer edges, which can lead to the occurrence of color unevenness. Accordingly, various techniques have been considered in order to solve such a problem (for example, JP-A-2010-14809).

In JP-A-2010-14809, a thermally-conductive filling material disposed between the reflective liquid crystal panel and a heat dissipation member is filled in a location on the back surface of the reflective liquid crystal panel that corresponds to a display region, and the heat from the entire display region is absorbed by the thermally-conductive filling material. Furthermore, the surface of the heat dissipation member that opposes the reflective liquid crystal panel is curved in a convex shape so that the central area of the heat dissipation member is closer to the reflective liquid crystal panel. The gap from the heat dissipation member in the center of the display region (a center gap) is smaller than the gaps from the heat dissipation member at the edges of that region (edge gaps) and the heat receiving efficiency of the heat dissipation member is greater in the center area than in the edge areas; in such a manner, the configuration attempts to make the temperature distribution uniform.

However, with JP-A-2010-14809, the thermally-conductive filling material is injected across the entirety of the display region, and thus there is almost no difference in the heat receiving efficiency throughout the display region. Furthermore, because the reflective liquid crystal panel is extremely small, providing the heat dissipation member with a curved surface results in only an extremely small difference between the center gap and the edge gaps. Accordingly, there is a problem in that there are almost no differences in the heat receiving efficiencies throughout the display region caused by the thermally-conductive filling material in the heat dissipation member, and thus it is not possible to make the temperature distribution sufficiently uniform throughout that region.

SUMMARY

An advantage of some aspects of the invention is to provide an electro-optical device and an electronic apparatus that make the temperature distribution throughout a display region uniform using a simple configuration.

An electro-optical device according to a first aspect of the invention includes: a reflective light modulation element configured by disposing a first substrate and a second substrate in opposition to each other; a heat dissipation member disposed opposing a second surface of the first substrate, the second surface being on the opposite side as a first surface of the first substrate that opposes the second substrate; and a thermal conductive member disposed between the first substrate and the heat dissipation member so as to make contact with the first substrate and the heat dissipation member. The heat dissipation member and the thermal conductive member are disposed so that the dimension from an end portion where the first substrate and the thermal conductive member come into contact with each other or an end portion where the thermal conductive member and the heat dissipation member come into contact with each other to an end portion of a display region in the second surface of the first substrate is greater than the thickness of the first substrate.

According to this aspect of the invention, the heat dissipation member and the thermal conductive member are disposed so that the dimension from an end portion where the first substrate and the thermal conductive member come into contact with each other or an end portion where the thermal conductive member and the heat dissipation member come into contact with each other to an end portion of a display region in the second surface of the first substrate is greater than the thickness of the first substrate. In other words, the thermal conductive member and the heat dissipation member are disposed so that only the central area of the display region makes contact at the second surface. Accordingly, the heat receiving efficiency at the center of the display region due to the thermal conductive member can be increased beyond that at the edges of that region, which makes it possible to dissipate, through the heat dissipation member, the heat received by the thermal conductive member. This makes the temperature distribution throughout the display region uniform, which makes it possible to suppress degradation of the liquid crystals due to high temperatures and thus suppress problems such as the occurrence of color unevenness.

In the electro-optical device, it is preferable for the thermal conductive member to be formed in a sheet shape.

According to this aspect of the invention, the thermal conductive member has a sheet shape, and thus the handling or installation thereof is simple. Furthermore, because the thermal conductive member is solid, a higher thermal conductivity can be achieved than with a liquid. Accordingly, the heat receiving efficiency at the center of the display region can be increased, thus making it possible to make the temperature distribution in the display region uniform.

In the electro-optical device, it is preferable for the sheet-shaped thermal conductive member to be formed in a shape that is smaller than the display region.

According to this aspect of the invention, the thermal conductive member is prepared in advance in a shape that conforms to the regions that experience high temperatures, and thus the temperature distribution can be made constant simply by installing the thermal conductive member on the heat dissipation member; this simplifies the manufacture of the electro-optical device. Furthermore, because the heat receiving distribution can be determined by only the shape of the thermal conductive member, it is not necessary to change the shape of the heat dissipation member itself in accordance with the temperature distribution of the display region, as is the case in JP-A-2010-14809. Accordingly, the same shape of heat dissipation member can be used for reflective light modulation elements having various heat emission circumstances, which makes it possible to simplify the manufacturing process of the heat dissipation member.

In the electro-optical device, it is preferable for the surface of the heat dissipation member that opposes the display region to be a convex surface of a shape that approaches the first substrate toward the center of the heat dissipation member, and for the sheet-shaped thermal conductive member to be disposed along the convex surface.

According to this aspect of the invention, the thermal conductive member can be disposed so as to come into contact with only the center of the display region using a simple configuration in which the thermal conductive member is simply disposed on the convex surface of the heat dissipation member; this makes the temperature distribution uniform in the display region. In addition, even in the case where the temperature has risen, the thermal conductive member can be pressed against the first substrate due to the expansion of the heat dissipation member, which increases the surface area of the areas of the thermal conductive member and the first substrate that make contact with each other. Accordingly, in the case where the temperature of the reflective light modulation element has risen, the heat receiving range of the center of the display region can be increased, thus making the temperature distribution of the display region uniform.

An electronic apparatus according to an aspect of the invention includes the electro-optical device described above.

According to this aspect of the invention, the electronic apparatus includes the electro-optical device according to the aforementioned aspects of the invention, and is thus capable of displaying a projected image in which color unevenness has been suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
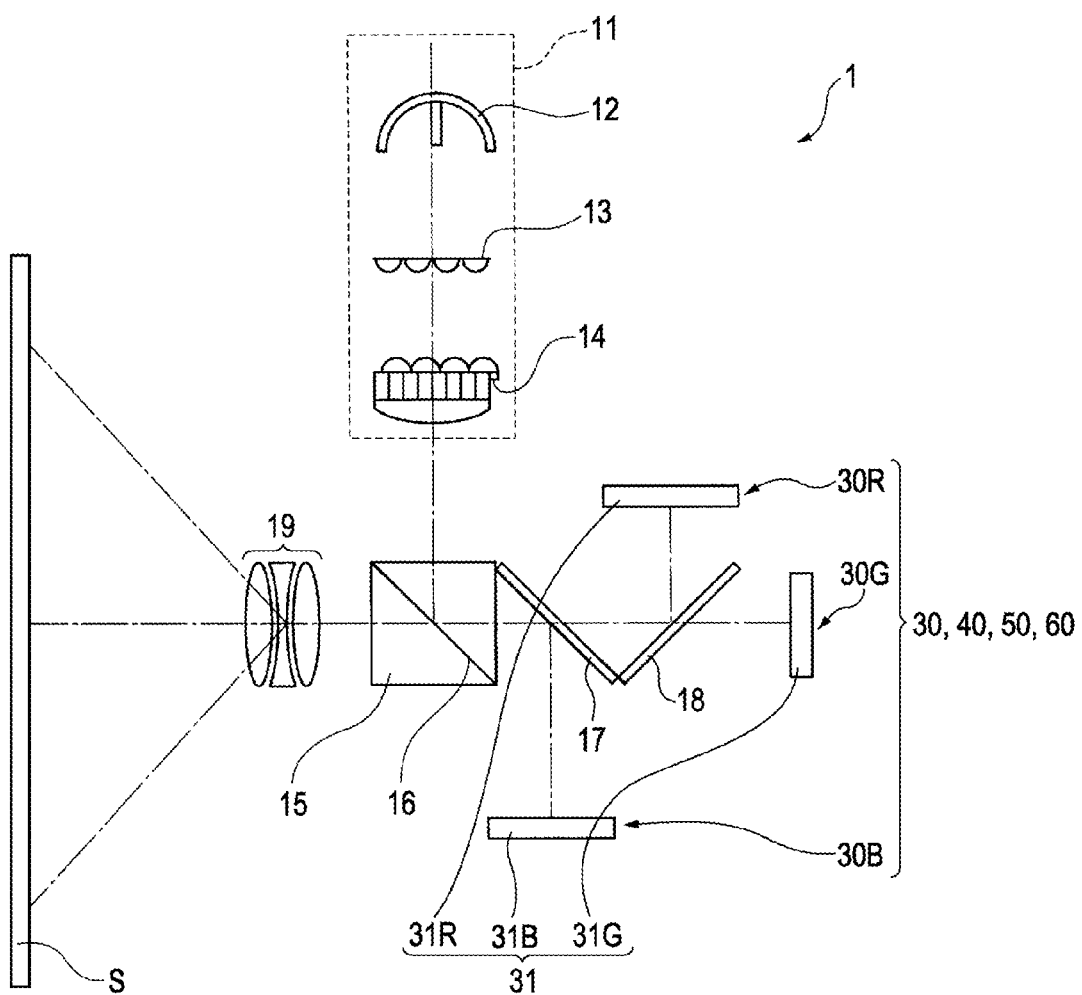
FIG. 1 is a diagram illustrating the configuration of a projector according to a first embodiment, a second embodiment, a third embodiment, and a variation on the invention.

Hereinafter, embodiments of the invention will be described based on the drawings.
First Embodiment
Projector Configuration FIG. 1 is a diagram schematically illustrating the general configuration of a projector 1.

The projector 1 forms a color image (image light) by modulating light beams emitted from a light source based on image information, and enlarges and projects that color image onto a screen S.

This projector 1 includes: a light source 12; a polarized illumination device 11 provided with an integrator lens 13 and a polarization conversion element 14; a polarizing beam splitter 15 that reflects, using an S-polarized light beam reflective surface 16, an S-polarized light beam emitted from the polarized illumination device 11; a dichroic mirror 17 that separates the blue light (B) component from the light reflected by the S-polarized light beam reflective surface 16 of the polarizing beam splitter 15; and a dichroic mirror 18 that reflects and separates the red light (R) component from the light beam after the blue light has been separated. The projector 1 also includes three reflective electro-optical devices 30 serving as electro-optical devices into which light of the respective colors enters (where the red-light reflective electro-optical device is assigned the reference numeral 30R, the green-light reflective electro-optical device is assigned 30G, and the blue light reflective electro-optical device is assigned 30B).

The three reflective electro-optical devices 30 each include reflective liquid crystal panels 31 (like the reflective electro-optical devices 30, the reflective liquid crystal panels for the respective colors of light are assigned the reference numerals 31R, 31G, and 31B, respectively) serving as reflective liquid crystal elements configured of what is known as LCOS (Liquid Crystal On Silicon), where liquid crystals have been formed upon a silicon substrate. Each of the reflective electro-optical devices 30 is disposed so that the respective reflective liquid crystal panels 31 are approximately orthogonal to the optical axis of the light beams that pass through the dichroic mirrors 17 and 18.

In the reflective liquid crystal panels 31, the orientation of the liquid crystals is controlled in accordance with a driving signal from a control device (not shown), thus modulating the deflection direction of the incident light and reflecting the light toward the dichroic mirrors 17 and 18.

Note that the reflective electro-optical devices 30 also include, in addition to the reflective liquid crystal panels 31, heat dissipation members 35 (not shown in FIG. 1) and thermal conductive members 38 (also not shown in FIG. 1), and the details of this configuration will be described later.

Figure 2:
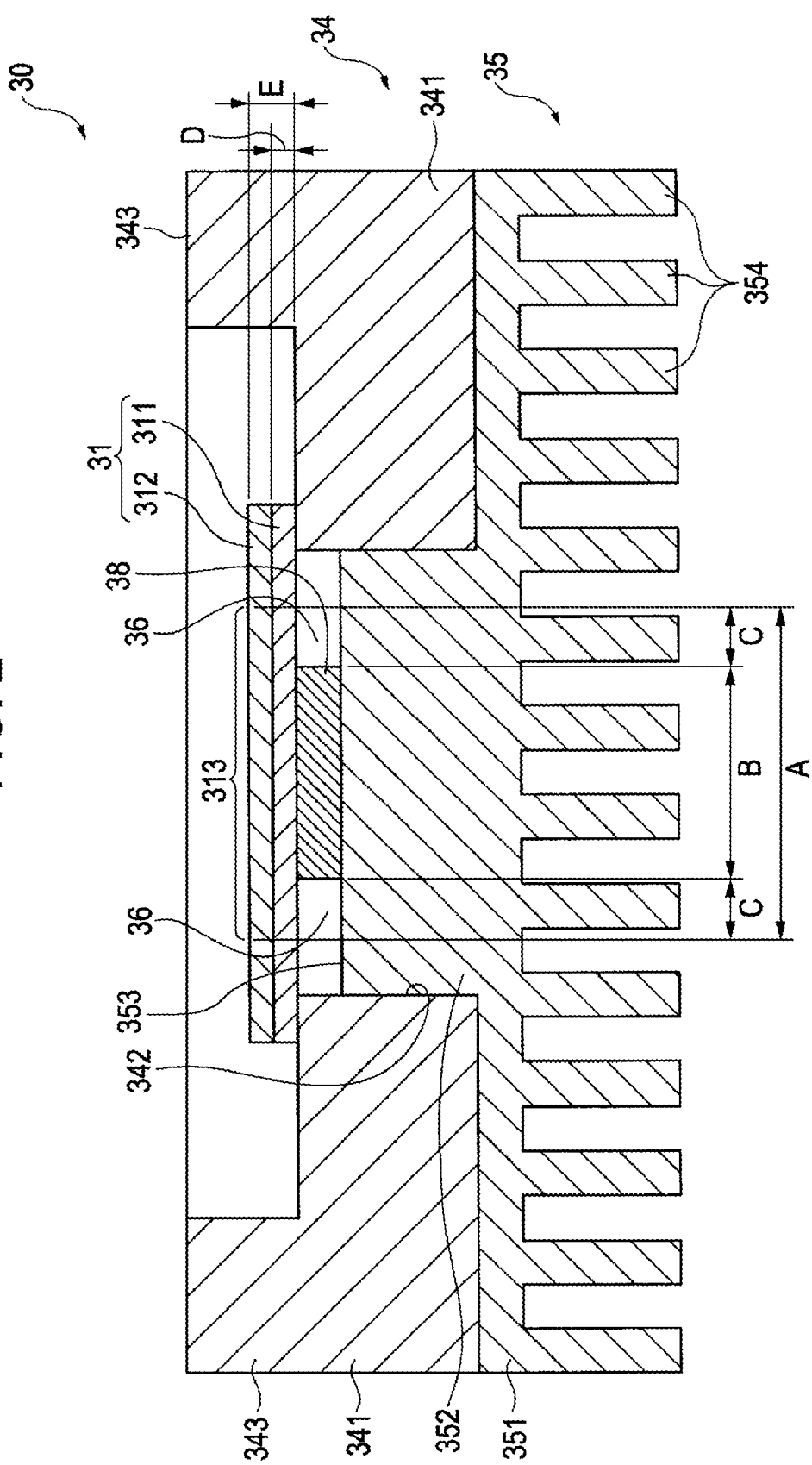
FIG. 2 is a cross-sectional view of a reflective electro-optical device according to a first embodiment.

The projector 1 then combines the light modulated by the three reflective electro-optical devices 30R, 30G, and 30B using the dichroic mirrors 17 and 18 and the polarizing beam splitter 15, and projects this combined light onto the screen S through a projection lens 19.
Detailed Configuration of Reflective Electro-optical Device FIG. 2 is a cross-sectional view illustrating the structure of the reflective electro-optical device 30.

The reflective liquid crystal panel 31 of which the reflective electro-optical device 30 is configured includes an element substrate 311 serving as a first substrate, an opposing substrate 312 disposed opposing a first surface of the element substrate 311 and serving as a second substrate, and liquid crystals (not shown) encapsulated and sealed between the two substrates. This reflective liquid crystal panel 31 displays an image in a display region 313 having a width dimension A by modulating incident light entering from the opposing substrate 312 based on image information.

The reflective electro-optical device 30 also includes a support member 34 that supports the element substrate 311 of the reflective liquid crystal panel 31. The support member 34 is formed of a metal having high thermal conductivity, such as aluminum. The support member 34, meanwhile, has a frame-shaped main support body 341 that includes an opening portion 342. The opening portion 342 is formed so as to have a shape that is smaller than the planar shape of the reflective liquid crystal panel 31. Wall portions 343 are disposed and erected from the edges of one surface of the main support body 341 (that is, the surface that supports the reflective liquid crystal panel 31). The support member 34 supports the reflective liquid crystal panel 31 so that the display region 313 is located inside the opening portion 342, within the edges of the opening portion 342.

Furthermore, the reflective electro-optical device 30 includes the heat dissipation member 35, which, like the support member 34, is formed of a metal having high thermal conductivity, such as aluminum, and is disposed on the other surface of the main support body 341 of the support member 34. This heat dissipation member 35 includes a heat receiving portion 351, having a plate shape whose planar shape is approximately the same as that of the main support body 341. A heat receiving protrusion 352 is provided in the heat receiving portion 351 so as to protrude from the center of one surface thereof (that is, the surface that opposes the support member 34). The outer circumferential surface of the heat receiving protrusion 352 is formed in a shape that enables the heat receiving protrusion 352 to fit with the opening portion 342 of the support member 34. The dimension degree to which the heat receiving protrusion 352 protrudes is set to be less than the depth dimension of the opening portion 342. Furthermore, a heat receiving tip surface 353 of the heat receiving protrusion 352 is formed in a flat shape.

Through this configuration, when the support member 34 and the heat dissipation member 35 are assembled such that the opening portion 342 and the heat receiving protrusion 352 fit together, and the main support body 341 and the heat receiving portion 351 come in close contact to each other (called a "heat dissipation member attached state" hereinafter), the reflective liquid crystal panel 31 and the heat receiving tip surface 353 are approximately parallel. In addition, a rectangular gap 36 is formed by the inner circumferential surfaces of the reflective liquid crystal panel 31, the heat receiving tip surface 353, and the opening portion 342.

In addition, multiple heat dissipation fins 354 that dissipate the heat received by the heat receiving protrusion 352 are provided in the heat receiving portion 351, protruding from the other surface thereof.

The reflective electro-optical device 30 also includes a thermal conductive member 38, disposed in the center of the gap 36. The thermal conductive member 38 is configured of a graphite sheet whose planar shape is smaller than that of the display region 313 and whose thickness is slightly greater than the depth dimension of the gap 36. To be more specific, a width dimension B of the thermal conductive member 38 is set so that a dimension C, from the end portion of the thermal conductive member 38 where the thermal conductive member 38 makes contact with the element substrate 311 when disposed in the center of the gap 36 to the end portion of the display region 313 corresponding to a second surface that is on the opposite side of the first surface of the element substrate 311 that opposes the opposing substrate 312 in the reflective liquid crystal panel 31, is greater than dimensions D and E. In other words, the width dimension A of the display region 313 is set to be equal to B+2×C.

According to this configuration, the thermal conductive member 38 disposed so as to be pressed against only the center of the display region 313 at the second surface of the element substrate 311 (that is, the surface exposed to the opening portion 342), and is not pressed against the edges thereof.

Effects of First Embodiment

According to the aforementioned first embodiment, the following effects can be achieved.

The thermal conductive member 38 is disposed in the gap 36 formed between the heat receiving protrusion 352 and the reflective liquid crystal panel 31 so that the dimension C from the end portion of where the thermal conductive member 38 and the element substrate 311 make contact with each other to the end portion of the display region 313 is greater than the thickness dimension D of the element substrate 311. Accordingly, the thermal conductive member 38 can receive heat from only the center of the display region 313 of the element substrate 311 and dissipate that heat. In other words, the heat receiving efficiency can be made greater at the center of the display region 313, where the temperature is higher than the edges thereof, than at the edges thereof. Accordingly, the temperature distribution throughout the display region 313 can be made uniform, which makes it possible to suppress degradation of the liquid crystals due to high temperatures and thus suppress the occurrence of color unevenness.

In addition, because a graphite sheet is used for the thermal conductive member 38, the thermal conductive member 38 can be handled and installed with ease. Furthermore, because the thermal conductivity of the graphite sheet is higher than that of liquid, the temperature distribution can be made uniform even in a case where there is a high temperature difference between the center and the edges of the display region.

Furthermore, using the thermal conductive member 38, whose width dimension is smaller than that of the display region 313, the heat receiving distribution can be determined by the shape of the thermal conductive member 38 alone. Accordingly, even if the heat receiving tip surface 353 has a simple planar shape, heat can be received only in the center of the display region 313 under various heat emission circumstances by changing the shape of the thermal conductive member 38. Therefore, a planar-shaped heat receiving tip surface 353 can be applied in a reflective liquid crystal panel 31 in various heat emission circumstances, thus making it possible to simplify the manufacturing process of the heat dissipation member 35.

Second Embodiment

Next, a second embodiment of the invention will be described.

Note that a reflective electro-optical device 40 according to the second embodiment and reflective electro-optical devices 50 and 60 according to the third embodiment and the variation, respectively, which will be described later, are installed in place of the reflective electro-optical device 30 according to the first embodiment as shown in FIG. 1.

Figure 3:
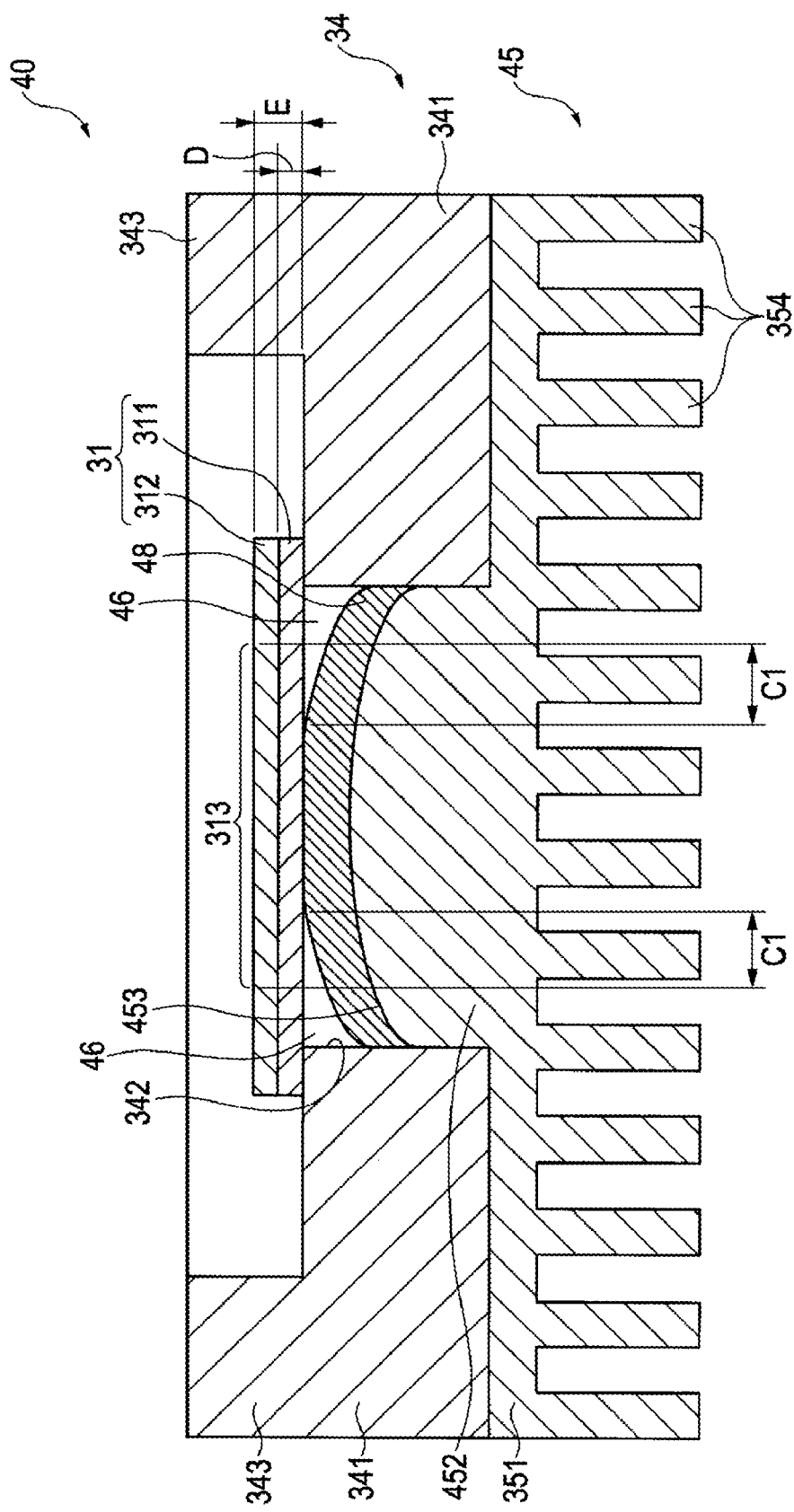
FIG. 3 is a cross-sectional view of a reflective electro-optical device according to a second embodiment.

FIG. 3 is a cross-sectional view illustrating the structure of the reflective electro-optical device 40.

Note that the basic structure of the second and third embodiments and the variation is the same as that of the first embodiment, and thus common elements will be assigned the same reference numerals, and descriptions thereof will be omitted.

As shown in FIG. 3, the reflective electro-optical device 40 includes a heat dissipation member 45 installed on the other surface of the main support body 341 of the support member 34. A heat receiving protrusion 452, capable of fitting with the opening portion 342 of the support member 34, is provided in the heat receiving portion 351 of the heat dissipation member 45, protruding from the center of the surface thereof. The dimension degree to which the heat receiving protrusion 452 protrudes is set to be less than the depth dimension of the opening portion 342. Furthermore, a heat receiving tip surface 453 of the heat receiving protrusion 452 is formed in a bulging shape so that the heat receiving tip surface 453 is closer to the element substrate 311 toward the center of the heat receiving tip surface 453.

According to this configuration, when the support member 34 and the heat dissipation member 45 are in the heat dissipation member attached state, a gap 46 is formed by the inner circumferential surfaces of the reflective liquid crystal panel 31, the heat receiving tip surface 453, and the opening portion 342, so that the gap between the reflective liquid crystal panel 31 and the heat receiving tip surface 453 narrows toward the center of the reflective liquid crystal panel 31.

Note that the heat receiving portion 351 is provided with heat dissipation fins 354 that protrude from the other surface.

The reflective electro-optical device 40 also includes a thermal conductive member 48, disposed in the gap 46. The thermal conductive member 48 is configured of a graphite sheet whose planar shape is slightly greater than that of the display region 313 and whose thickness is slightly greater than the depth dimension of the center of the gap 46. Through such a configuration, when disposed along the heat receiving tip surface 453, the thermal conductive member 48 is disposed so as to be pressed against only the center of a location corresponding to the display region 313 in the element substrate 311, and is not pressed against the edges thereof.

Here, the thickness of the thermal conductive member 48 is set so that the dimension, from the end portion of the thermal conductive member 48 where the thermal conductive member 48 makes contact with the element substrate 311 to the end portion of the display region of the element substrate 311, is a dimension C1. Here, the dimension C1 is set to be greater than the thickness dimension D of the element substrate 311 and greater than the thickness dimension E of the reflective liquid crystal panel 31.

Effects of Second Embodiment

According to the aforementioned second embodiment, the following effects can be achieved in addition to the same effects as those of the first embodiment.

The thermal conductive member 48 is disposed along the heat receiving tip surface 453, which has a bulging shape that is closer to the element substrate 311 toward the center of the heat receiving tip surface 453. Accordingly, heat can be received only in the center of the display region using a simple configuration in which the thermal conductive member 48 is simply disposed on the heat receiving tip surface 453; this makes is possible to make the temperature distribution of the display region uniform. In addition, when the temperature rises, the thermal conductive member 48 is pressed against the element substrate 311 due to the expansion of the heat dissipation member 45, which increases the surface area of the portion that makes contact; this in turn makes it possible to increase the heat receiving range of the center of the display region, thus making the temperature distribution of the display region uniform.

Third Embodiment

Next, a third embodiment of the invention will be described.

Figure 4:
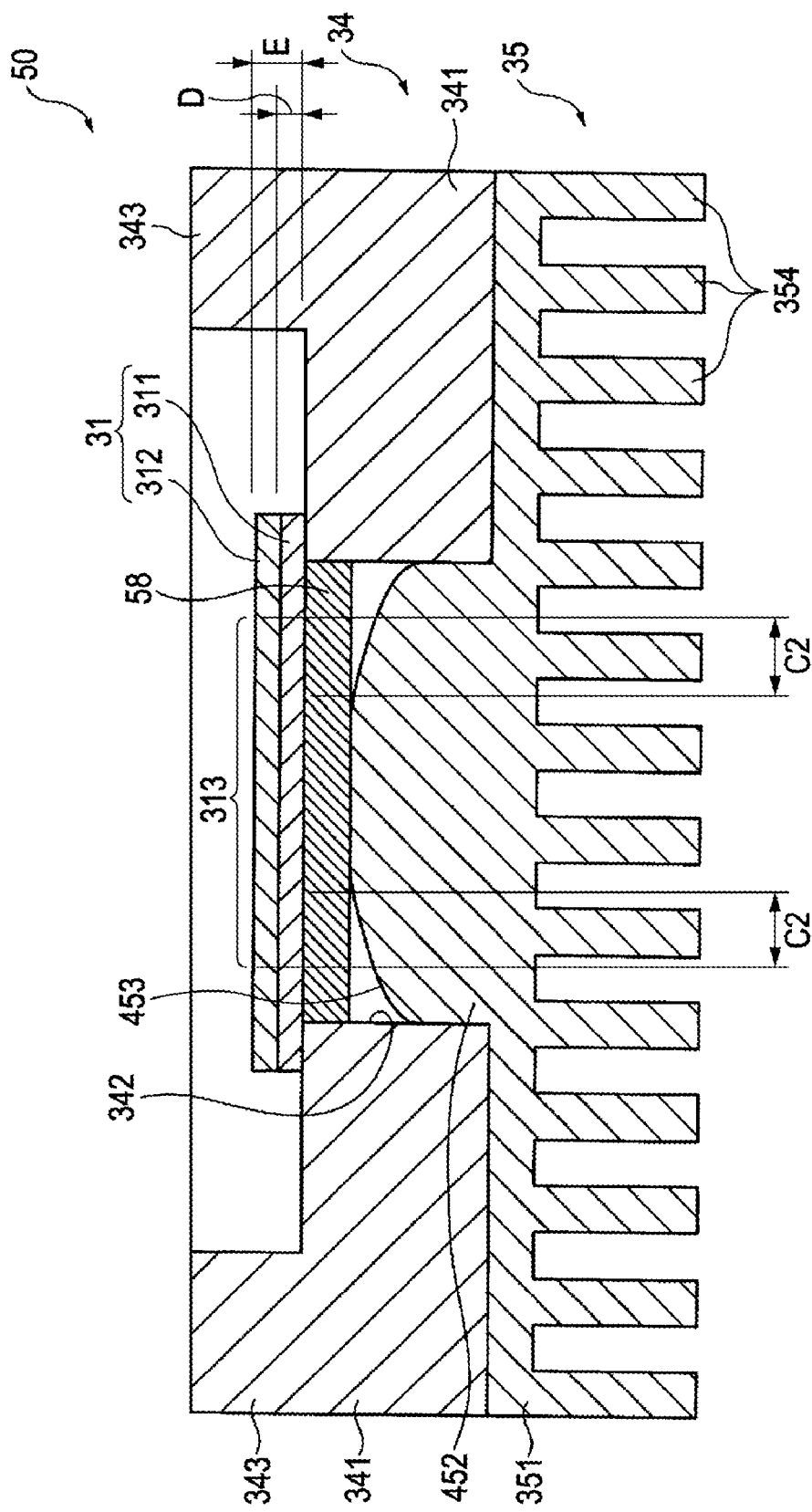
FIG. 4 is a cross-sectional view of a reflective electro-optical device according to a third embodiment.

FIG. 4 is a cross-sectional view illustrating the structure of the reflective electro-optical device 50.

The only differences between the reflective electro-optical device 50 according to the third embodiment and the reflective electro-optical device 40 according to the second embodiment are the shape of a thermal conductive member 58 and the location in which the thermal conductive member 58 is disposed.

Specifically, the thermal conductive member 58 is configured of a graphite sheet whose planar shape is approximately the same planar shape as the opening portion 342 of the support member 34 and whose thickness is the same as that of the thermal conductive member 48 in the second embodiment. The entirety of one surface of the thermal conductive member 58 is attached to the entire surface that is exposed through the opening portion 342 of the element substrate 311, or in other words, to the entirety of the display region, whereas the center of the other surface makes contact with the heat receiving tip surface 453.

In addition, the thermal conductive member 58 is set to a shape so that the dimension from the end portion of the thermal conductive member 58 that makes contact with the heat receiving tip surface 453 to the end portion corresponding to the position of the display region 313 is a dimension C2 that is greater than the dimensions D and E.

Effects of Third Embodiment

According to the aforementioned third embodiment, the following effects can be achieved in addition to the same effects as those of the first and second embodiments.

The thermal conductive member 58 is formed so that the dimension from the end portion where the thermal conductive member 58 makes contact with the heat receiving tip surface 453 to the end portion at the location corresponding to the display region 313 is the dimension C2, and is then disposed on the element substrate 311. In other words, while the thermal conductive member 58 makes contact with the entirely of the display region from the standpoint of the element substrate 311, the thermal conductive member 58 only makes contact with the center of the area that corresponds to the display region 313 from the standpoint of the heat receiving tip surface 453. Accordingly, a combination of the heat receiving capability of the thermal conductive member 58 and the heat receiving capability of the heat receiving tip surface 453 at the center of the display region can be made greater than that at the edges. Accordingly, the temperature distribution throughout the display region 313 can be made uniform, which makes it possible to suppress degradation of the liquid crystals due to high temperatures and thus suppress the occurrence of color unevenness.

Variation

Note that the invention is not limited to the aforementioned embodiments, and variations, improvements, and so on that fall within the scope of the advantages of the invention are also included as part of the invention.

Figure 5:
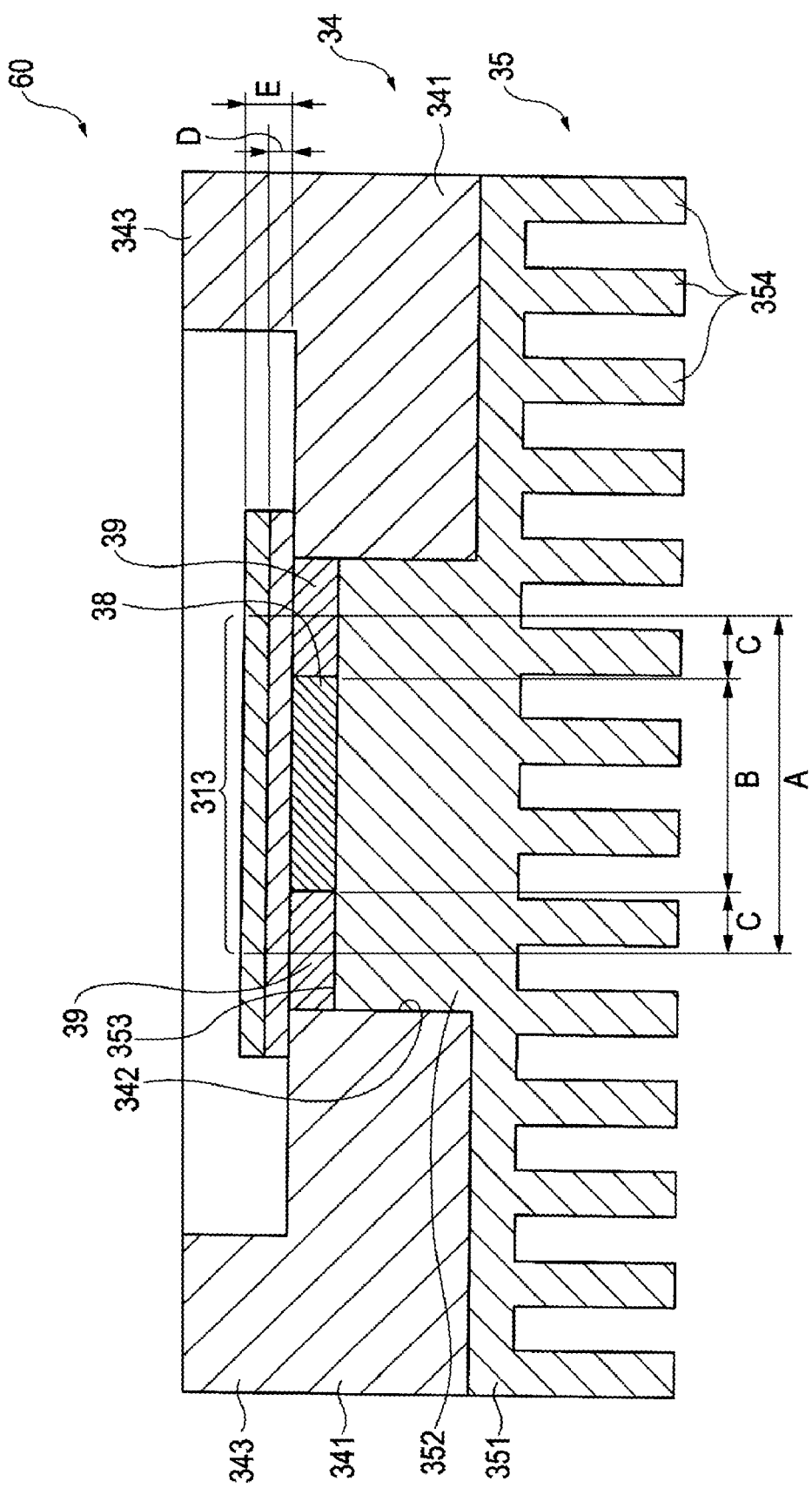
FIG. 5 is a cross-sectional view of a reflective electro-optical device according to a variation on the invention.

FIG. 5 is a cross-sectional view illustrating the reflective electro-optical device 60 according to a variation on the first embodiment of the invention. In this variation, the portion of the gap 36 in which the thermal conductive member 38 is not disposed is filled with a filling material 39. Although having a lower thermal conductivity than a graphite sheet, a gel-form substance that has a certain degree of thermal conductivity, such as silicon, can be used as the filling material. According to this variation, the heat receiving efficiency of regions can be increased for regions likely to experience high temperatures and decreased for other areas, thus making the temperature distribution uniform even in a reflective liquid crystal panel 31 whose temperature difference is high.

In addition, in the first embodiment, rather than providing the heat receiving protrusion 352, a thermal conductive member whose thickness is slightly greater than the depth of the opening portion 342 may be provided.

What is claimed is:

1. An electro-optical device comprising:
   a reflective light modulation element that has a first substrate and a second substrate in opposition to each other, the first substrate having a first surface that opposes the second substrate and a second surface that is on the opposite side as the first surface of the first substrate;
   a heat dissipation member disposed opposing the second surface of the first substrate; and
   a thermal conductive member disposed between the first substrate and the heat dissipation member so as to make contact with the first substrate and the heat dissipation member, wherein the heat dissipation member and the thermal conductive member are disposed so that the dimension from an end portion where the first substrate and the thermal conductive member come into contact with each other or an end portion where the thermal conductive member and the heat dissipation member come into contact with each other to an end portion of a display region in the second surface of the first substrate is greater than the thickness of the first substrate.

2. The electro-optical device according to claim 1,
wherein the thermal conductive member is formed in a sheet shape.

3. The electro-optical device according to claim 2,
wherein the sheet-shaped thermal conductive member is formed in a shape that is smaller than the display region.

4. The electro-optical device according to claim 2,
wherein the surface of the heat dissipation member that opposes the display region is a convex surface of a shape that approaches the first substrate toward the center of the heat dissipation member; and
the sheet-shaped thermal conductive member is disposed along the convex surface.

5. An electronic apparatus comprising the electro-optical device according to claim 1.

* * * * *